UNITED STATES PATENT OFFICE.

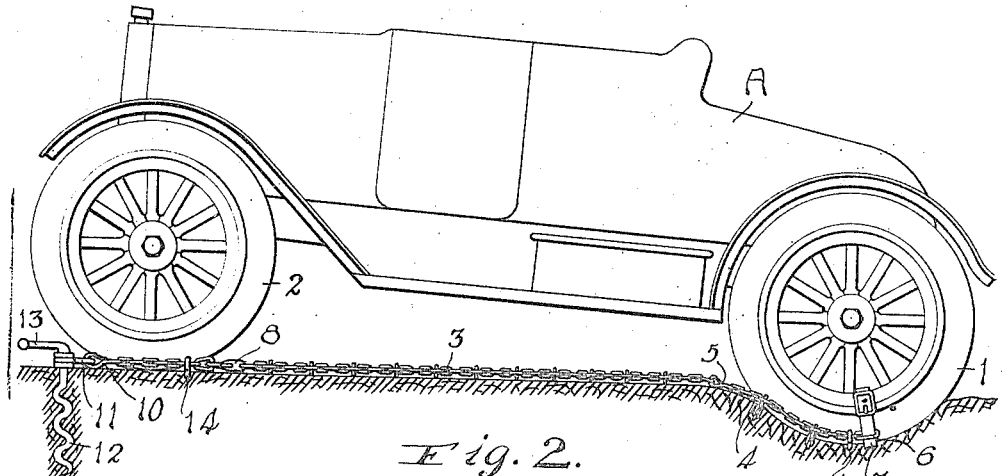

FRED ERVIN, OF SIOUX FALLS, SOUTH DAKOTA.

DEVICE FOR PULLING AUTOMOBILES OUT OF MUD-HOLES.

1,269,268.   Specification of Letters Patent.   Patented June 11, 1918.

Application filed March 2, 1917. Serial No. 152,013.

*To all whom it may concern:*

Be it known that I, FRED ERVIN, a citizen of the United States, residing at Sioux Falls, in the county of Minnehaha, State of South Dakota, have invented a new and useful Device for Pulling Automobiles Out of Mud-Holes; and I do hereby declare the following to be a full, clear, and exact description of the invention, such as will enable others skilled in the art to which it appertains to make and use the same.

The present invention relates to a device for pulling automobiles out of mud holes, and has for its object to provide a device of this character which embodies novel features of construction whereby the power of the drive wheels can be utilized in the most advantageous manner and an automobile readily gotten out of a mud hole by the use of its own power.

Further objects of the invention are to provide a device of this character which is comparatively simple and inexpensive in its construction, which can be readily applied to the automobile, which can be packed in a very small amount of space when not in use, and which is so constructed as to utilize the standard tire chains which are carried by practically all motorists as a part of their regular equipment.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of an automobile, showing the device as applied thereto and in position for enabling the rear wheels to be moved out of a mud hole when power is applied thereto.

Fig. 2 is a top plan view of an automobile chassis with the device applied thereto.

Fig. 3 is an enlarged detail perspective view of one of the spreader bars which is utilized to maintain the side chains in a spaced relation.

Corresponding and like parts are referred to in the following description and indicated in all the views of the drawings by the same reference characters.

The fundamental idea of the invention is to provide a flexible track element formed with spaced side cables connected at intervals by cross ties, one end of the flexible track element being connected to the tire of a drive wheel, while the other end thereof is suitably anchored at the front of the machine, the track element being adapted to be wound upon the tread of the tire when power is applied to the wheel and serving both to guide the wheel and to admit of the power being applied in the most advantageous manner. Prior devices have been constructed for a similar purpose, in which an auxiliary drum is clamped to the hub portion of the wheel and arranged to have a cable wound thereon. With this arrangement the pull upon the cable tends to force the wheel downward, since the connection between the cable and the drum is at a distance above the surface of the ground. Furthermore, the pulling power is increased to such an extent that an excessive strain is placed upon the gearing, with the result that there is a grave possibility of injuring the mechanism. These objections are overcome by the present device, in which the flexible track element is secured to the tread portion of the tire, thereby tending to lift the wheel upwardly when power is applied thereto, and also providing a trough-like track for guiding the wheels.

Referring more particularly to the drawings, which show one embodiment of the invention, the reference character A designates a conventional motor vehicle which is provided with the rear drive wheels 1 and front wheels 2. One of the devices is preferably provided for each of the drive wheels 1, and each of the devices includes a regular tire chain 3 such as are adapted to be applied to the rear wheels to prevent skidding on slippery pavements. A supplemental chain 4 is detachably connected by suitable fasteners 5 to one end of each of the tire chains 3, said supplemental chains terminating in loops 6 of a suitable size to receive straps 7. As indicated quite clearly by Fig. 1, these straps 7 are designed to be applied to the tires and rims of the rear wheels, thereby connecting the chains to the drive wheels in such a manner that the chains will be wound upon the treads of the tires when the wheels are caused to rotate. The opposite end of each of the tire chains 3 is detachably connected in some suitable manner, as by means of the snap fasteners 8, to a pair of diverging chains 9 which are connected at their converging ends to a snap fastener 10 which engages an eye 11 swiveled upon the upper end of a stake 12. The lower end of each of the stakes 12 is pointed and twisted substantially into the form of a convolute so that the stake can be readily screwed into the ground, and a handle 13 is provided at the upper end of each of the stakes for convenience in manipulating the stake when placing it in position or removing it therefrom. The chain sections 3 and 4 are each formed with the usual spaced side chains or cables which are connected at intervals by cross chains or cables, and in order to hold the side chains properly spaced, stiff spreader bars 14 are applied to the short chains 9 and supplemental chains 4, respectively. These spreader bars 14 are curved to conform to the tread of the tire, and terminate at their ends in loops 14ª which loosely engage horizontal links of the side chains, being held against longitudinal movement upon the side chains by engagement with the vertical links thereof.

The straps 7 are designed to be applied to the rear or drive wheels 1, as indicated by Fig. 1, and the anchoring stakes 12 arranged just to one side of the corresponding front wheels 2. The side chains of the members 3 and 4 are maintained in a properly spaced relation by the spreader bars 14, so that what may be termed a trough-shaped track is provided for the rear wheels 1. When power is applied to the rear wheels, the chains are mounted upon the treads of the tires and the pull of the chains exerted in such a manner as to have a tendency to lift the wheels out of the mud hole. The steering wheels 2 are initially turned to bring the vehicle into alinement with the chains 3 and 4, and are again straightened out as soon as this is accomplished. This arrangement enables the vehicle to be pulled out of any mud hole, provided the straps 5 can be applied to the tops of the drive wheels, and the device can be very conveniently carried, since it packs in a very small amount of space when not in use, the regular tire chains which are always carried by motorists constituting a large part of the device.

Having thus described the invention, what I claim as new and desire to secure by Letters Patent, is:—

The herein described device for pulling automobiles out of the mud, including, in combination with an automobile tire chain formed with side chains and cross links, of a similar complemental chain length detachably coupled to one end of the tire chain, a stiff spreader bar extending transversely across the supplemental chain length for holding the side chains in a properly spaced relation, attaching means for securing the end of the supplemental chain length to the periphery of an automobile wheel, a pair of converging side chains detachably connected to the opposite end of the tire chain, a stiff spreader bar extending transversely between the flared ends of the converging chains, the spreader bars being curved to correspond to the curvature of the tire, an anchor stake, and means for connecting the converging chains to the anchor stake.

In testimony whereof I have signed my name to this specification in the presence of two subscribing witnesses.

FRED ERVIN.

Witnesses:
 CLARK B. OVERCASH,
 N. N. COON.